Figure 1:
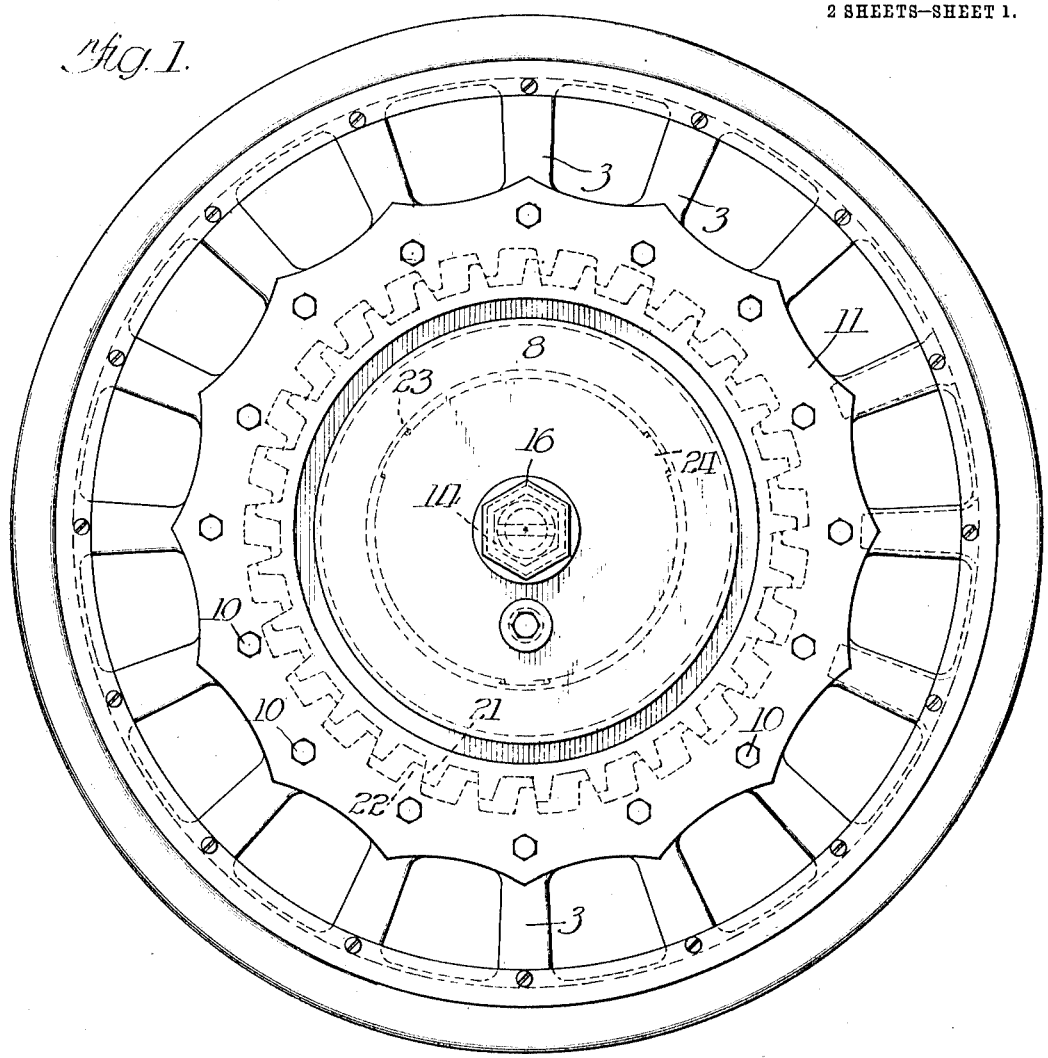

J. E. MUHLFELD.
WHEEL.
APPLICATION FILED SEPT. 23, 1910.

1,064,156.

Patented June 10, 1913.
2 SHEETS—SHEET 1.

J. E. MUHLFELD.
WHEEL.
APPLICATION FILED SEPT. 23, 1910.
1,064,156. Patented June 10, 1913.
2 SHEETS—SHEET 2.
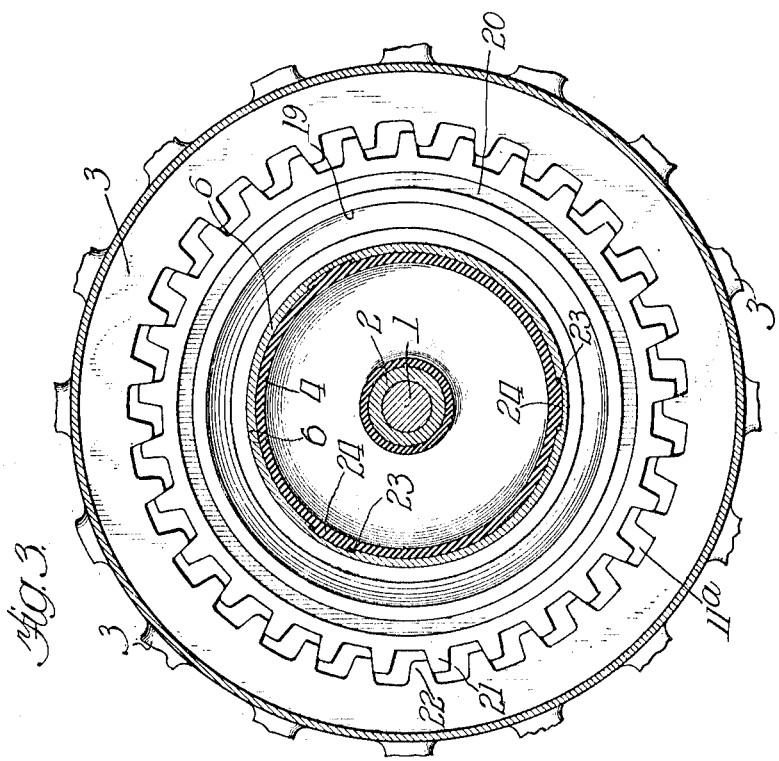
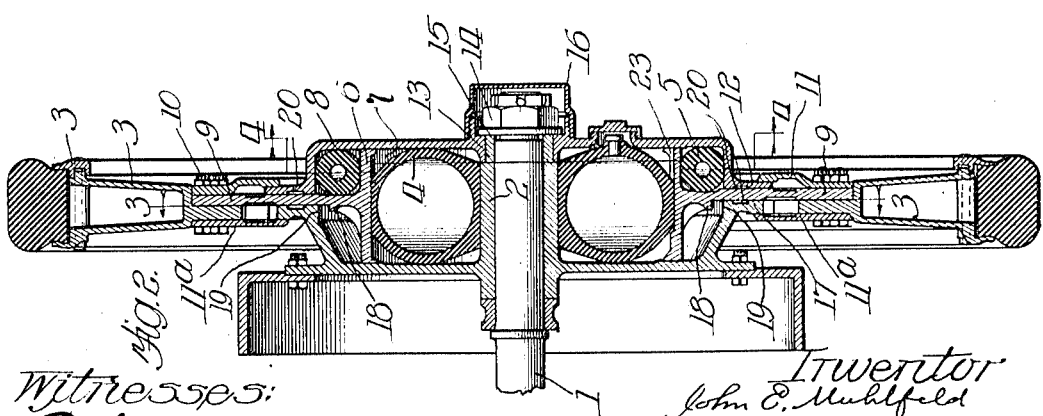

UNITED STATES PATENT OFFICE.

JOHN ERHARDT MUHLFELD, OF BALTIMORE, MARYLAND.

WHEEL.

1,064,156.　　　　Specification of Letters Patent.　　Patented June 10, 1913.

Application filed September 23, 1910. Serial No. 583,387.

*To all whom it may concern:*

Be it known that I, JOHN E. MUHLFELD, a citizen of the United States, residing in the city of Baltimore, in the State of Maryland, have invented a new and useful Improvement in Wheels, of which the following is a specification.

My invention relates to improvements in wheels and more particularly to resilient wheels or wheels having provision for cushioning or absorbing shock.

The object of my invention is to provide a resilient, cushioning or shock absorbing wheel, suitable for use as a vehicle or automobile wheel or other uses, which will be of a strong, simple, efficient and durable construction, in which the resilient or cushioning members will act efficiently and have a double or dual cushioning action at diametrically opposite points of the wheel, and at the same time be protected and not exposed to puncture or other injury, which will at the same time act to efficiently cushion both light and extremely heavy or severe shocks or obstructions, in which the resilient or cushioning members may be readily and conveniently removed and replaced, and in which the wheel will be used and retain cushioning action of one of the resilient members in case the other or pneumatic one bursts.

My invention consists in the means I have devised to practically accomplish this object or result, as herein shown, and described and more particularly specified in the claims.

The wheel embodying my invention comprises in coöperative combination, a central hub section or member and an outer rim section or member, the one adapted to turn and also move eccentrically or radially in respect to the other to a limited extent, and inner and outer resilient members interposed between said hub and rim sections, so that the inner and outer resilient members exert a double or dual cushioning action at diametrically opposite points of the wheel, the inner cushioning member, for example, being compressed at the point thereof between the ground and the axis of the wheel and the outer resilient member being at the same time compressed at the point thereof between the axis of the wheel and the portion of the rim directly above the axis as the wheel rolls upon the ground, if it is a vehicle wheel. The central or hub member of the wheel is provided with a chamber, preferably closed and in part formed by a removable plate to receive the inner and outer resilient members, and the outer section or rim member of the wheel is provided with a circular flange or cushion engaging ring at its inner periphery for engagement with the inner and outer resilient members and between which said circular flange or cushion engaging ring fits. For convenience of construction this circular flange or cushion engaging ring is preferably made in a separate piece from that portion of the rim section or member of the wheel which bears the outer tire. Any suitable connecting means may be employed to connect the central and hub members of the wheel together in such manner as to cause the one to rotate with the other, while at the same time permitting the one to have a limited turning movement in respect to the other, and also a limited radial movement or movement transverse to the axis in respect to the other. This connecting means, however, preferably consists in a sliding joint having suitable anti-friction means to provide for the radial movement or movement transverse to the axis of the wheel, and gear teeth or projections at the meeting peripheries of the two members to cause the one to rotate with the other, while at the same time providing for a limited turning movement of the one in respect to the other. These and other features of my invention will be fully understood by those skilled in the art from the accompanying drawing forming a part of this specification, and the following detail description thereof.

Figure 4:
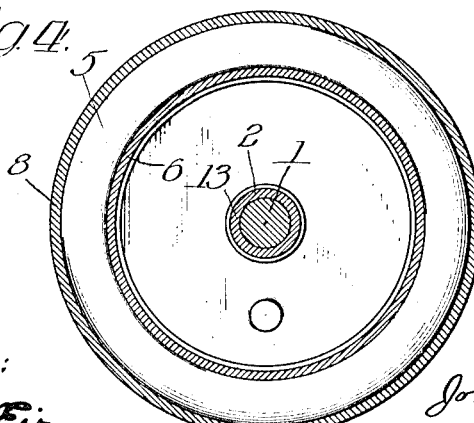

In said drawing, Figure 1 is a side elevation of a resilient or cushioning wheel embodying my invention. Fig. 2 is a section of the entire wheel on a plane passing through the axis of the hub. Fig. 3 is a detail section on line 3—3 of Fig. 2 and Fig. 4 is a detail section on line 4—4 of Fig. 2.

In the drawing, 1 represents the axle of an automobile or other vehicle or device to which the wheel is applied.

2 is the central section or hub member of the wheel, 3 the outer section or rim member of the wheel, 4 the inner resilient member, preferably a pneumatic tube, 5 the outer resilient member, preferably a hollow rubber ring and 6 the cushion engaging ring or flange of the outer or rim member 3 which is interposed between the resilient members 4 and 5, so that any radial or transverse movements of the hub and rim members of the wheel in respect to each other will cause the two resilient members to be both compressed, one on one side of the axis of the wheel and the other on the other side thereof or at diametrically opposite points.

The central or hub member 2 of the wheel is provided with an annular chamber 7 in part formed by and closed by a removable cover plate 8 to receive the resilient members 4 and 5 and the cushion engaging ring 6 of the rim member 3. The cushion engaging ring 6 of the rim member 3 is preferably made in a separate piece from the rim member 3 and its web portion 9 is rigidly and removably secured to the rim member 3 by clamp bolts 10 which also pass through the retaining ring 11 for the periphery or flange portion 12 of the hub cover plate 8. The cover plate has a sleeve fit on the shouldered or reduced portion 13 of the hub and is rigidly secured in place on the hub by a threaded nut 14 and washer 15 and by the screw cap 16. The hub member 2 has an annular flange portion 17 which is embraced between the retaining ring 11$^a$ and the web portion 9 of the rim member 3 while the flange portion 12 of the hub cover plate is similarly embraced between the retaining ring 11 and said web portion 9 of the hub member 3, thus affording a movable or sliding connection between the central or hub member and the outer or rim member of the wheel. Interengaging limiting stops 18, 19 on the hub and rim members of the wheel serve to limit the extent of radial movement or movement transverse to the axis of the wheel of the hub and rim members in respect to each other, and the consequent compression of the resilient members 4, 5 of the wheel. The interengaging faces 9, 11, 11$^a$ of the rim member and 12, 17 of the hub member may be provided with any suitable anti-friction devices, such as ball or roller bearings if desired, but the anti-friction means which I prefer to use are simply grease chambers 20.

Any suitable means may be employed to cause the hub and rim members of the wheel to rotate in the same direction, one with the other, while at the same time providing for a limited turning movement of the one in respect to the other. But the means I prefer to employ for this purpose consists in intermeshing gear teeth or projections 21, 22 on the meeting peripheries of the hub and rim members respectively, sufficient play being provided between the teeth to permit of the limited turning movement of the hub and rim members in respect to each other, and also to permit of the required limited radial movement or movement transverse to the axis of said rim and hub members in respect to each other. By using gear teeth for this purpose on the rim and hub members of the wheel, the power applied to the one member to drive the other tends to centralize instead of decentralize the two members in respect to each other.

To prevent the inner or pneumatic cushioning member 4 from turning or revolving, I provide the inner peripheral face of the cushion engaging ring 6 with notches or recesses 23 to receive lugs or projections 24 on the cushioning member 4. The outer or rim section 3 of the wheel is shod or provided with a tire 25 of any suitable material at its outer peripheral or felly portion 26. This tire is preferably of rubber and it is preferably removably secured in place by removable tire flanges or rings 27 of a converging or dovetail shape to fit the diverging or dovetail portion 28 of the tire. The tire flanges or rings 27 are removably secured to the rim portion of the wheel by bolts 29 and threaded nuts 30.

31 represents the brake drum secured to the hub member of the wheel as is customary in automobile wheels.

The cover plate 8 of the hub member of the wheel is provided with a removable screw cap 32 to give access to the nipple 33 for inflating the inner cushioning member in cases where this inner cushioning member is of the pneumatic type.

The hub and rim members of the wheel, as well as the outer tire and inner and outer cushioning members may each and all be made of any suitable materials. I, however, prefer to employ rubber for the outer cushioning member instead of springs, and to employ a pneumatic rubber tube for the inner cushioning member instead of springs, and rubber for the outer tire instead of metal. The hub section of the wheel is preferably entirely composed of metal, as indicated in the drawing. The outer or rim section 3 of the wheel may be made either entirely of metal or in part of metal and in part of wood, as preferred.

It will thus be seen that in my invention the arrangement of the inner and outer cushioning or resilient members is such that the action of the inner member is independent of the action of the outer member, but any movement, oscillation, vibration or other change in position of the outer rim section in relation to the central hub section will tend to bring both the inner and outer cushioning members into compression at one and the same time, but on opposite sides of the axis of the wheel, and both the inner and outer cushioning members will also react in the same radial direction to return central hub and outer rim sections to a normal or concentric position. In my invention also, the inner cushioning or resilient member 4 is free to move in a revolving direction on the central bushing portion of the hub member 2, but is secured by suitable lugs or keying means to the inner face or cushion engaging ring 6 of the rim member 3 of the wheel so that any revolving, crawling or turning tendency of this inner resilient member 4 must take place at the central hub bushing of the hub member.

In my invention the size and form of the closed compartments into which the resilient member receiving chamber of the hub section is divided by the cushion engaging ring of the rim member bear a certain relation to the size and form of the inner and outer cushioning members, so that when the same are under compression, the reduction in size of the compartments will tend to cause the cushioning members to completely fill the same and thus serve to limit the eccentric movement of the rim section in relation to the hub section. In my invention also, as illustrated in the drawing, the inner and outer cushioning members are graduated in relation to each other, the inner member to take the preliminary, and the outer member to take the final or ultimate oscillation, vibration or movement between the central or hub member and the outer or rim member of the wheel. In my invention, it will also be understood that the compression of the inner cushioning member takes place between the central hub member and that portion of the outer or rim member which is under load, and the compression of the outer cushioning member takes place diametrically opposite and between the central hub member and that portion of the outer rim member which is not under load or vertically above the axis in the case of a vehicle wheel rolling upon the ground. In my invention also, although both the inner and outer members are essential to the proper working and resiliency of the wheel as a whole under normal conditions, the arrangement and coöperative action is such that the wheel as a whole is serviceable and has a certain amount of resiliency when either one of the two cushioning members is for any cause inoperative. In my invention it will also be understood that the action of the outer rim member in relation to the hub member is such that the radial distance from the axle shaft or pivot center to that portion of the rim member periphery which is under load will be the same or less than the radial distance from the axle shaft or pivot center to that portion of the rim member periphery which is diametrically opposite and not under load. In my invention the means of contact or connection between the central hub section and the outer rim section for the purpose of rotating, propelling or otherwise moving both sections in the same direction is such that the central hub section can at all times oscillate, vibrate or move concentrically or eccentrically in relation to the outer rim section, regardless of the point of application of the load or rotating or propelling power.

I claim:—

1. In a wheel, the combination with a hub member, of a rim member movable in respect thereto, and inner and outer resilient members interposed between said hub and rim members, said hub and rim members simultaneously compressing said resilient members on opposite sides of the wheel center, and interengaging stops to limit the radial movement of said hub and rim members in respect to each other, said stops comprising circular ribs, substantially as specified.

2. In a wheel, the combination with a hub member, of a rim member movable in respect thereto, and inner and outer resilient members interposed between said hub and rim members, said hub and rim members simultaneously compressing said resilient members on opposite sides of the wheel center, and interengaging stops to limit the radial movement of said hub and rim members in respect to each other, and connecting means to cause said hub and rim members to rotate together in the same direction and also permit a limiting turning movement of the one in respect to the other, said means comprising interengaging wedge shaped members, substantially as specified.

3. In a wheel, the combination with a hub member, of a rim member movable in respect thereto, said hub and rim members having engaging faces, and inner and outer resilient members interposed between said hub and rim members, said hub and rim members simultaneously compressing said resilient members on opposite sides of the wheel center, and interengaging stops to limit the radial movement of said hub and rim members in respect to each other, and gear teeth on the meeting peripheries of said hub and rim members to cause them to rotate together in the same direction and also permit a limited turning movement of the one in respect to the other.

4. In a wheel, the combination with a hub member, of a relatively movable rim member, and two cushioning devices interposed between said members and simultaneously compressed, one on one side of the wheel center and the other on the opposite side thereof, said hub and rim members having at their meeting peripheries interengaging teeth to cause them to rotate together, substantially as specified.

5. In a wheel, the combination with a hub member, of a rim member movable in respect thereto, and inner and outer resilient members interposed between said hub and rim members, said hub and rim members simultaneously compressing said resilient members on opposite sides of the wheel center, and interengaging stops to limit the radial movement of said hub and rim members in respect to each other, and connecting means to cause said hub and rim members to rotate together in the same direction and also permit a limiting turning movement of the one in respect to the other, said connecting means having provision to cause the propelling power to act to centralize said hub and rim members in respect to each other, substantially as specified.

6. In a wheel, the combination with a hub member, of a rim member movable in respect thereto, and inner and outer resilient members interposed between said hub and rim members, said hub and rim members simultaneously compressing said resilient members on opposite sides of the wheel center, and interengaging stops to limit the radial movement of said hub and rim members in respect to each other, and gear teeth on the meeting peripheries of said hub and rim members to cause them to rotate together in the same direction and also permit a limited turning movement of the one in respect to the other, said gear teeth causing the propelling power to act to centralize said hub and rim members in respect to each other, substantially as specified.

7. In a wheel, the combination with a hub member having an annular chamber and a removable cover plate closing said chamber, of a relatively movable rim member having a separate piece cushion engaging ring provided with a web portion embraced between said hub member and its cover plate, and inner and outer annular cushioning devices in said annular chamber on opposite sides of said cushion engaging ring, said hub and rim members having interengaging limiting stops, substantially as specified.

8. In a wheel, the combination with a hub member having an annular chamber and a removable cover plate closing said chamber, of a relatively movable rim member having a separate piece cushion engaging ring provided with a web portion embraced between said hub member and its cover plate, and inner and outer cushioning devices in said annular chamber on opposite sides of said cushion engaging ring, said hub and rim members having interengaging limiting stops, said hub and rim members having interengaging gear teeth at their meeting peripheries, substantially as specified.

9. In a wheel, the combination with a hub member having an annular chamber formed integrally therewith and a removable cover plate closing said chamber, of a relatively movable rim member having a separate piece cushion engaging ring provided with a web portion embraced between said hub member and its cover plate, and inner and outer cushioning devices in said annular chamber on opposite sides of said cushion engaging ring, said inner cushioning device and said cushion engaging ring of said rim member having means for preventing turning of the one in respect to the other, substantially as specified.

JOHN ERHARDT MUHLFELD.

Witnesses:
 H. H. HOUCK,
 WILLIAM F. PODLICH.